May 30, 1950

C. S. PENFIELD 2,509,608

FORMATION TESTER

Filed April 28, 1947

Inventor: Charles S. Penfield
By his Attorney:

May 30, 1950 C. S. PENFIELD 2,509,608
FORMATION TESTER

Filed April 28, 1947 3 Sheets-Sheet 2

Inventor: Charles S. Penfield
By his Attorney:

May 30, 1950     C. S. PENFIELD     2,509,608
FORMATION TESTER

Filed April 28, 1947     3 Sheets-Sheet 3

Inventor: Charles S. Penfield
By his Attorney:

Patented May 30, 1950

2,509,608

UNITED STATES PATENT OFFICE 2,509,608

FORMATION TESTER

Charles S. Penfield, Bakersfield, Calif., assignor to Shell Development Company, San Francisco, Calif., a corporation of Delaware Application April 28, 1947, Serial No. 744,475

7 Claims. (Cl. 255—1.4)

This invention relates to an apparatus for testing formations adjacent oil or gas wells, and pertains particularly to an apparatus adapted to contact and penetrate a mud sheath on the well wall and to withdraw a sample of fluid from the formation.

Various types of tools, known as formation testers, have been heretofore devised and employed to obtain samples of fluid from the producing zones of a well.

One commonly used method involves drilling into the bottom of the borehole to be tested with a bit having an outside diameter smaller than the one previously used. Testing equipment, attached to the drill string, is then lowered into the well formation and seated on the shoulder of the reduced diameter borehole, commonly known as a rat-hole. Operation of a valve within the tester then reduces the hydrostatic fluid-column load on the rat-hole below the packer, allowing fluid therefrom to pass into the tester and thence into the drill pipe. Frequently, however, such cone or rat-hole packers fail to effect a seal with the result that the fluid sample retained in the drill pipe is contaminated with drilling fluid or mud drawn into the rathole from above the packer.

A full-hole method of testing formations consists in using an apparatus having one or more annular side wall packers designed to expand and seal off a portion of the borehole, for example, when the lower end of the apparatus is rested on the bottom of the borehole. All such forms of testing apparatus, directed to securing a circumferential seal, are susceptible to failure when the section of the hole at the sealing point deviates substantially from the normal circular form, or when the axially applied forces and consequent drill pipe movement are sufficient to crumple the seating surfaces or destroy the packer material. It is therefore a primary object of this invention to provide an apparatus adapted to seal off sections of the wall of a borehole which may or may not vary considerably from the normal circular form, and to collect and store fluids flowing from the sealed off formation.

It is also an object of this invention to provide a formation tester comprising a packer element adapted to be forced into fluid-tight contact with the walls of the borehole by the hydrostatic pressure of the fluid standing in the borehole.

Since drilling fluids or muds are employed during drilling operations, the formations through which the well penetrates are covered with a thin layer of mud cake, the function of which is to minimize the loss of liquid from the mud which fills the borehole. However, while obtaining test samples of fluid from the formations traversed by the borehole, this mud cake tends to hinder the flow of formation fluid into the borehole and into the testing apparatus. It is therefore a further object of the present invention to provide a formation tester constructed to pierce the mud sheath and at the same time to pack off the formation around the pierced area so as to allow a sample of the formation liquid to flow into the tester without being contaminated with drilling fluid.

Another object of this invention is to provide an apparatus for testing wells which may be attached to the end of a string of pipe for lowering into the well to a predetermined level where it can be firmly anchored in position.

Another object of the present invention is to provide an apparatus for testing wells which is first anchored and then operated at a predetermined level by a further downward motion of the pipe string after the anchoring device of said apparatus has been released.

It is also a special object of this invention to provide means for making a series of independent tests at various depths without withdrawing the drill pipe and formation testing equipment from the well, said means comprising a bailer adapted to be lowered on a wire-line into operative connection with the present formation tester.

Another object of the present invention is to provide a simple and inexpensive method of testing formations, thus decreasing costs and loss of time incidental to the use of the previously mentioned methods.

Other objects of this invention will appear from the following description taken with reference to the attached drawings, wherein.

For clarity, the present formation tester will be described hereinbelow with regard to the illustrated embodiments thereof, it being understood that the present invention is in no way restricted to said illustrated embodiments, but has a scope defined only in the claims attached to the present specification.

Briefly, the formation tester of the present invention comprises a central body member or housing adapted to be attached to a pipe string and lowered into a borehole, a testing element mounted in said housing for outward and inward radial or lateral motion with regard to said housing, fluid conduit means in said testing element and said body member in communication with the space outside thereof, means associated with said body member for anchoring it in the borehole, and actuating means for projecting said testing element from the housing to engage a formation to be tested, and subsequently to withdraw said testing element back into the body member.

Figure 1:
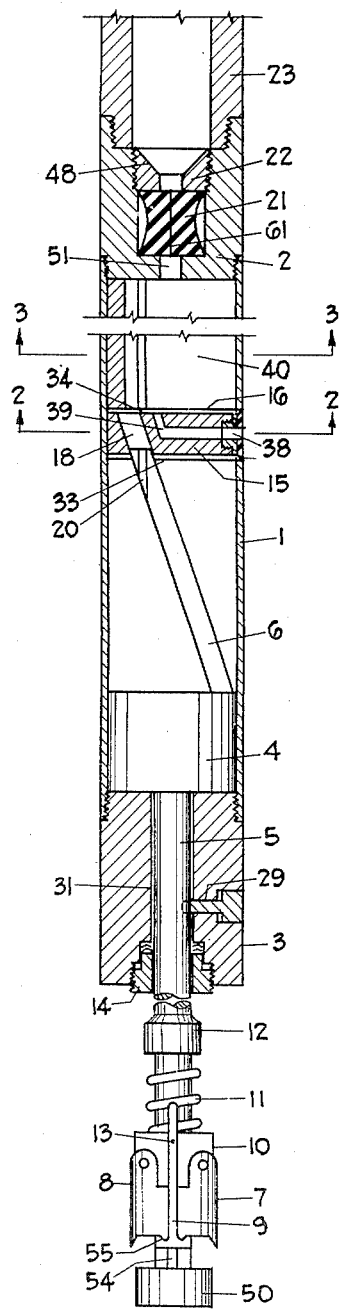
Fig. 1 is a diagrammatic view, partly in longitudinal section, of an embodiment of the formation tester of the present invention.

Referring more in detail to Fig. 1 of the drawing:

The central body member comprises a hollow tubular housing 1 closed at the upper and lower ends by the solid members or plugs 2 and 3 respectively. Slidably mounted within the casing 1 is a piston or plunger 4 rigidly attached to a solid mandrel 5 which extends through an axial opening 31 in the solid member 3 at the lower end of the housing 1 and also through a stuffing box 14 located therein. The lower part of the mandrel 5 has an enlarged section 10 having, mounted pivotally thereon, spears 7 and 8 which serve as the anchoring means. While the apparatus is lowered into the borehole, the anchoring spears 7 and 8 are releasably locked in an inoperative position by a trigger mechanism comprising inverted T-shaped holding members 9 that are slidably mounted in longitudinal dovetailed slots 54 on either side of the enlarged mandrel section 10, said members 9 being formed to engage the projections 55 on the spears 7 and 8. A shear pin 13 passing through the trigger members 9 holds the trigger in an anchor-retaining position. A second shear pin 29 holds the apparatus in an inoperative position until the anchoring spears have been set. A coil spring 11 is wound around the mandrel 5 above the enlarged portion thereof. Also mounted on said mandrel 5 is a slidable, relatively heavy mass 12 in the form of a ring which contacts the spring 11 and is supported thereby.

Figure 2:
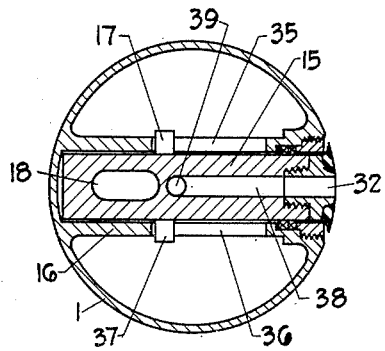
Fig. 2 is a cross sectional view taken along the line 2—2 in Fig. 1.

Firmly affixed to the top of the plunger 4, in a slanting or transverse position with regard to the axis of the housing 1, is a bar-type lever or guide 6 which operates a testing element 15. Referring to Fig. 2, the testing element 15 is shown as a cylinder mounted slidably within a guide sleeve or housing 16 which is securely mounted in a transverse position within the body casing 1, so that one end of the guide sleeve 16 is closed by said casing while the other or outer end is in communication with the space outside said housing 1 through a port 32. Two slots, 33 and 34, are cut in the top and bottom walls of the guide sleeve 16 to allow passage of the lever 6 therethrough.

Figure 4:
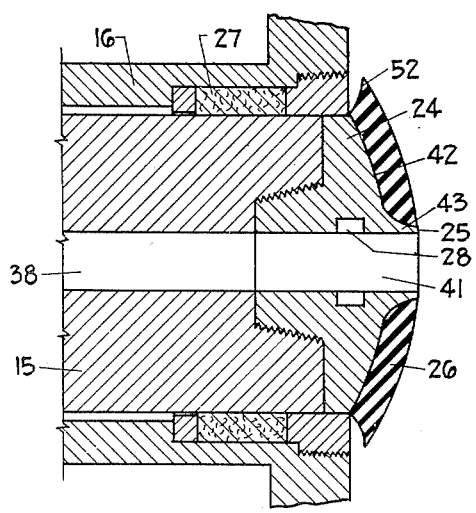
Fig. 4 is a cross sectional view in a horizontal plane, in detail, of one end of the testing element 15.

The testing element or test cylinder 15 is held in sliding alignment within the sleeve by means of guide pins 17 and 37 attached to the side walls of said testing element 15 and located slidably in two horizontal guide slots 35 and 36 in the side walls of the guide sleeve 16. The testing element 15 is a solid piston having a longitudinal fluid passageway 38 therein communicating, through a connecting fluid channel 39 and the slot 34 in the top of the guide sleeve 16, with the fluid sample chamber 40 formed inside of the housing 1. Attached to the outer or front end of the testing element 15, as shown in Fig. 4, is a removable nose plate 24 having an axial bore 41 therethrough in communication with the fluid passageway 38 in said element 15. The face 42 of the nose plate 24 has a projecting central portion 43 forming an outwardly extending cutting edge 25 around the axial bore 41. Adjacent said cutting edge 25 is a surrounding resilient packer 26 which may be made of any suitable packing material such as rubber, synthetic rubber, rubberized fabric, etc. In the preferred embodiment of the testing element 15, the nose plate 24 and the packer 26 attached thereto are shaped so as to form a surface which is cylindrical so as to conform with the circumference of the borehole, as seen from Fig. 4. The test cylinder 15 is sealed in the guide sleeve 16 by packing 27. A recess 28 in the nose plate 24 allows the use of an expandable wrench when installing said nose plate 24.

Figure 3:
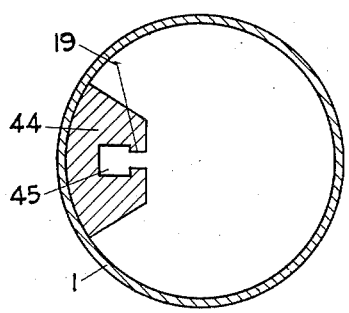
Fig. 3 is a cross sectional view taken along the line 3—3 in Fig. 1.
Figure 6:
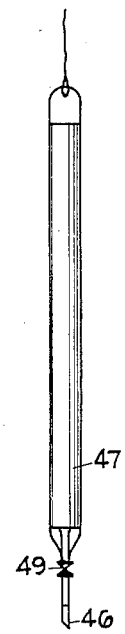
Fig. 6 is a diagrammatic view illustrating a bailer for use with the device of the present invention.
Figure 7:
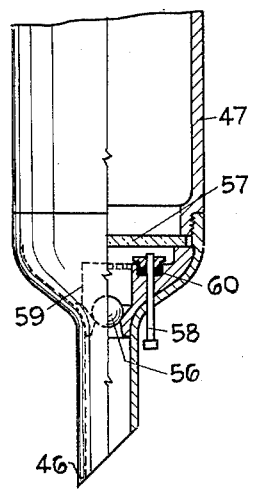
Fig. 7 is a diagrammatic view, partly in longitudinal section, of one embodiment of a bailer used in the present invention.

To allow the passage of the guide 6 through the testing cylinder 15, a channel 18 (Fig. 2) of suitable size and shape is located in register with said guide in the rear portion of said cylinder behind the fluid passageways 38 and 39. Permanently attached to the inner wall of the casing 1 is a member 44 (Fig. 3) having a longitudinal guide slot 45 with guide rails 19 on each side of said slot which engage the grooves 20 (Fig. 1) on either side of the guide 6. The upper solid end 2 of the casing 1 has an axial bore 51 therethrough which is normally sealed in a fluid-tight manner by means of a resilient packer 21 of suitable material and design to permit the hollow needle-like point 46 of a bailer 47 (shown in Fig. 6) to pierce it and then to reseal said bore 51 when the point 46 is withdrawn. The packer 21 is made of any pierceable and self-sealable material such as rubber, synthetic rubber or any resilient organic elastomers, e. g., polyesters of high molecular weight. The packer 21 is preferably constructed as a cylinder having an axial perforation 61 therethrough. When the packer 21 is inserted into the member 2 and tightened by means of the bushing 22, the pressure applied to the elastic material of the packer causes it to seal in a fluid-tight manner the axial perforation 61 therethrough. The packer thus seals the bore 51 at all times to prevent contaminating drilling fluid from entering the chamber 40, while allowing fluid samples to be withdrawn therefrom by use of the bailer 47, whose needle-pointed nose 46 is capable of forcing its way through the packer 21 by piercing said packer or distending the compressed axial perforation therethrough. The hydrostatic bailer is equipped with a trip valve means 49 which opens when it contacts the tapered bore 48 of the bushing 22 after the point 46 has pierced the packer seal 21. This valve means may take the form of a ball valve 56 and a breakable disk 57 as shown in the bailer 47 in Fig. 7, said bailer having located near its point 46 a breaking pin 58 which, upon contacting the tapered bore 48 of the bushing 22, is forced upward so that it shatters the breakable disk 57, allowing fluid to enter the bailer. The ball valve 56, in a suitable cage 59, prevents fluid from leaving the bailer while packing 60 seals the pin 58 in a fluid-tight manner. The packer 21 is held in place by the threaded guide bushing 22 with a tapered axial bore 48 which serves as a guide for the point 46 of the bailer 47. The upper end 2 of the housing 1 is threaded for connecting said housing 1 to the bottom section of a pipe string 23.

Figure 5:
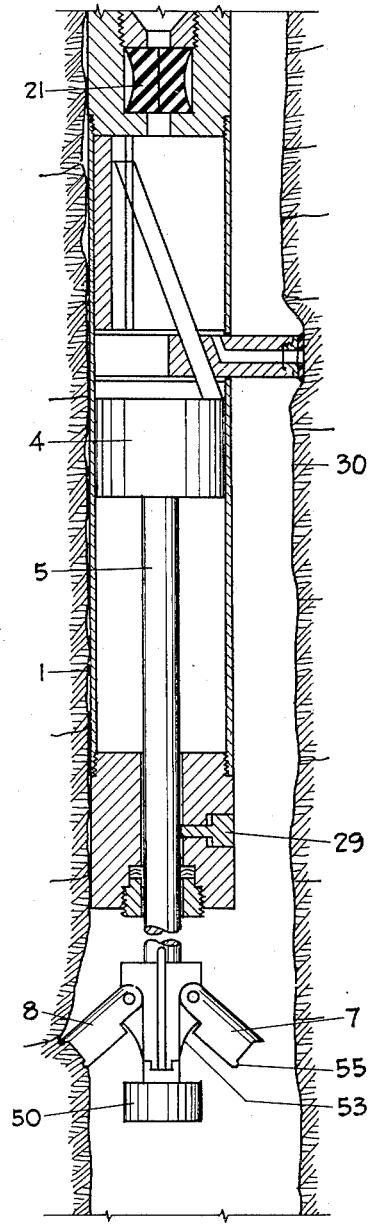
Fig. 5 is a diagrammatic view, partly in longitudinal section, of one form of the formation tester of the present invention while positioned in a borehole.

In operation, the apparatus shown in Fig. 1 is attached to the bottom section of a pipe string and lowered into a borehole to a depth at which a fluid sample is desired. By suitably operating the draw-works, the pipe string 23 is then dropped a few feet and suddenly caught with a brake, thereby causing the slidable mass 12 to strike by inertia the upper end of the T-shaped holding members 9, shearing pin 13 and allowing springs 53 to force spears 7 and 8 to contact and penetrate the wall of the borehole 30 as shown in Fig. 5. A base plate 50 provides an abutment to limit the downward movement of the holding members 9. The pipe string is then slowly lowered, and after the spears 7 and 8 have been firmly forced into the sides of the borehole, a further lowering of the pipe string causes the pin 29 to shear. Continued lowering of the pipe string causes the top of guide 6 to pass through the slot 33 in the bottom of guide sleeve 16 and engage the channel 18 in the testing cylinder 15, thus forcing said cylinder 15 outward to contact the wall of the borehole 30.

After the top of the guide 6 passes through said channel 18 and the slot 34 in the top of the guide sleeve 16, the guide 6 engages the guide rails 19, by means of the guide slots 20. The vertical relative motion of the guide elements 19 and 20 with regard to each other causes the inclined or slanting body of the guide 6 to exert a radial pressure on the walls of passage 18, thus forcing the test cylinder 15 out of the casing 1. Increased radial pressure on the testing element 15 causes the cutting edge 25 around the axial bore of the nose plate 24 to fracture the mud cake on the wall of the borehole 30, at the same time forcing the cylindrical face of the surrounding packer 26 against the borehole wall so as to seal said fracture in a fluid-tight manner from the rest of the borehole. The action of the packer also prevents the nose plate 24 from entering the wall of the borehole 30 to any substantial depth and thus eliminates the possibility of cutting a formation core which might clog the apparatus. When the apparatus is positioned as shown in Fig. 5, the hydrostatic bailer 47 is lowered, for example on a sand line inside the pipe string until the hollow needle-point end 46 of said bailer pierces or passes through the resilient packer 21. The bailer valve 49 is opened by contact with the tapered bore 48, thus reducing the pressure within the test cylinder and the chamber 49 to the low pressure value of the bailer. Formation pressure then causes the formation fluid to enter the orifice 41 of the nose plate 24 and to flow through the fluid passageways 38 and 39 in the testing element 15, into the fluid sample chamber 40 within the housing 1, and thence into the bailer 47, the pressure within the bailer 47 being substantially below that of the well or the formation. With the reduction of the pressure in said test cylinder 15 and the portion of the formation that is in contact therewith and is sealed off by the packer 24, the hydrostatic pressure of the drilling mud, acting horizontally, forces the packer 26 even more firmly against the borehole wall, thus improving the sealing action. After the fluid sample has been collected the bailer and the sample therein are withdrawn and raised to the surface.

To unseat the tool, the pipe string is raised slightly, which causes the mandrel 5, the piston 4, and guide 6 to move down relative to the housing 1, forcing the test cylinder 15 back into the guide sleeve 16 in its inoperative position. A particularly advantageous feature of the present invention is that additional formation samples may be taken at other points in the borehole without removing this device therefrom by merely raising the pipe string and anchoring and operating the apparatus in the manner already described. When samples of formation fluid are desired near the bottom of the borehole, the entire apparatus may be lowered until the base plate 50 rests on the bottom of the hole, thus obviating the setting of the anchoring spears 7 and 8.

It is understood that although a preferred method of actuating the testing member against the walls of the borehole has been described herein by way of an example, equivalent mechanical or hydraulic methods of effecting such actuation are likewise encompassed within the scope of the present claims.

Figure 8:
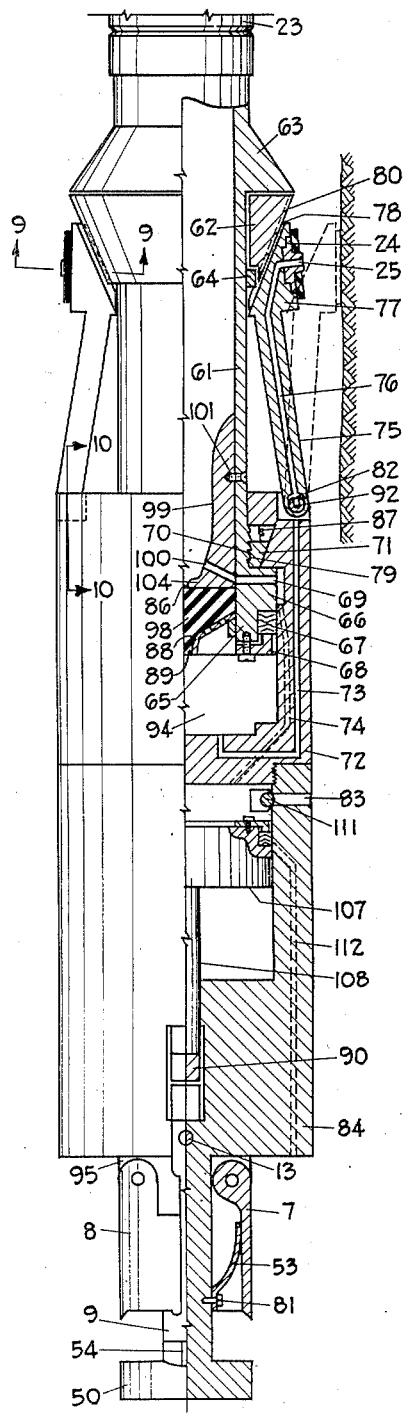
Fig. 8 is a diagrammatic view, partly in longitudinal section, of another embodiment of the formation tester of the present invention.

Thus, another embodiment of the formation tester comprising a body member having similar anchoring means and radially acting testing elements is shown in Fig. 8. In this embodiment, however, the pressure of fluid circulating through the pipe string 23 is utilized to shear the pin 13 which holds the anchoring means in the inoperative position. By means of this circulating fluid the bailer 47 can be circulated up or down inside the pipe string 23. Also, in this embodiment a different lever or wedge means is employed to force the testing elements against the sides of the borehole.

In Fig. 8, a mandrel 61, attached by regular pipe threads (not shown) to the pipe string 23, carries on its outer wall a loose-fitting, rotatable, tapered bowl 62, held in place by an upper stop member 63 formed or attached on the outside of the mandrel 61 and a lower bowl support member 64. The enlarged lower end 65 of the mandrel 61 has a shoulder 66 formed therein to seat rings of packing 67 which are held in place by a gland 68. Directly above the shoulder 66 is a fluid circulating port 69. Above said port, course sliptype step threads 70 are cut into the mandrel body 61 which match the corresponding threads 79 in spring-loaded slips 71, subjected to the upward pull of spring 87.

Figure 9:
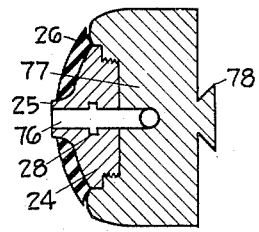
Fig. 9 is an enlarged cross sectional view taken along the line 9—9 in Fig. 8.

Surrounding the lower end of the mandrel 61 is a housing 72 having fluid sample passageways 73 and fluid circulating passageways 74 formed longitudinally in the walls thereof. In hinged attachment with the upper end of the housing 72 are one or more testing elements which comprise an arm 75, having an enlarged head 77 at the upper end thereof with a fluid sample passageway 76 extending through said arm and head, The inside face of the head 77, which contacts the rotatable bowl 62, is tapered at the same angle as the bowl and has a dovetail key 78 (Fig. 9) which is adapted for slidable movement within a matching keyway 80 in the tapered face of the rotatable bowl 62. Referring to Fig. 9, the head 77 is similar to the one used in the first embodiment (Fig. 4) having a detachable nose plate 24 with its central cutting edge 25, rubber packer 26 and wrench socket 28.

Figure 10:
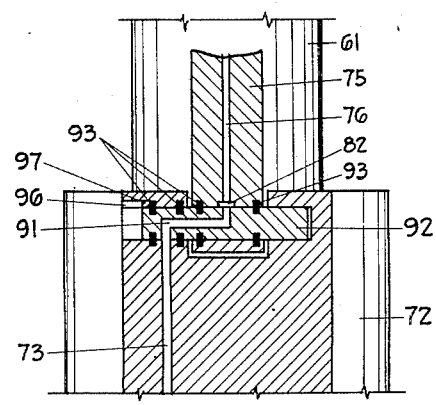
Fig. 10 is a longitudinal section view taken along the line 10—10 in Fig. 8.

Fig. 10 shows in detail the pin 92 rotatably connecting the arm 75 to the housing 72. A fluid sample passageway 91 in the pin 92 communicates with the fluid sample passageway 73 in the housing and at all times is in communication with the fluid sample passageway 76 in the arm 75 through a fluid channel 82 in the arm 75 (see also Fig. 8) which extends part way around the pin 92, thus allowing the arm 75 to change position without closing the fluid passageways. Sealing rings 93 prevent the leakage of sample fluid while passing through the fluid passageway 91. A key 97 on the pin 92 maintains the alignment of sample passageways 73 and 76 when positioned in the keyway 96.

Attached to the lower end of the housing 72 is a lower housing member 84 containing a piston 107 and a piston rod 108 having a T-shaped lower end 90. Pivotally mounted on the outside of a downwardly extending portion 95 of the lower housing member 84 are the anchoring spears 7 and 8 and trigger mechanism previously described above in Fig. 1 of the first embodiment. An enlarged base plate 50 attached to the lower end of the housing member 84 prevents the spears 7 and 8 from engaging the formation while the apparatus is being lowered into the borehole.

Referring to Fig. 8, the lower end of the mandrel 61 is normally closed by a rubber fluid seal 98 (similar to seal 21 in Fig. 1) which is secured in place by an annular holding plate 88 having a central opening 89 therethrough. Above said seal 98, a tapered bushing or bailer guide 99 is fastened to the mandrel 61 either in the same manner as bushing 22 of Fig. 1, or by means of a retaining pin 101, as shown in Fig. 8, said guide 99 having an axial opening 86 and a circulating fluid port 100.

In operation, the apparatus shown in Fig. 8 is attached to the bottom section of a pipe string 23 and lowered into the borehole to the lowest depth at which it is desired to secure a sample of formation fluid. After thus positioning the apparatus, circulating fluid is pumped down the pipe string 23, through ports 100 and 69 and fluid passageway 74 to act against the piston 107 after closing the check valve 111 of filling ports 83. The fluid pressure forces the piston 107 downward causing the T-shaped lower end 90 of the piston rod 108 to contact and exert a downward pressure against the top end of the T-shaped spear latch 9 shearing the pin 13 and thereby releasing the anchoring spears 7 and 8 which are forced outward against the sides of the borehole by springs 53 which are attached to the lower part of the apparatus by bolts 81, or other means. Further downward movement of the piston 107 opens a fluid circulating passageway 112 so that all circulation thereafter will be around the piston thus preventing any build-up of fluid pressure within the piston chamber after the anchoring spears have been released.

After the spears 7 and 8 have been released, the apparatus and pipe string 23 are lowered until the spears are firmly embedded in the sidewalls of the borehole and are capable of supporting a predetermined initial weight as shown by the weight indicator at the driller's position at the wellhead. The pipe string 23 is then raised until only a relatively small increment of the initial weight is supported by the anchoring spears 7 and 8. At this time, the pipe string 23 is rotated, thereby rotating the attached mandrel 61 and screwing it downward in the step threads 70 of the mandrel 61 and slips 71. Continued rotation causes the step threads 70 of the mandrel 61 to completely disengage from the slips 71. Rotation is then discontinued as the mandrel 61 may now be lowered without causing additional weight to be placed on the spears 7 and 8.

Continued lowering of the mandrel 61 causes the heads 77 of the testing elements to be forced outward as the tapered side of the bowl 62 slides along the taper of the heads 77. This action causes the nose piece 24 and, in particular, the cutting edge 25 (Fig. 9) to engage the side of the borehole and pierce the mud sheath formed thereon, while the surrounding packer 26 seals the formation around the cutting edge 25. Lowering of the pipe string is continued until the weight indicator at the surface shows that some of the predetermined weight is again placed on the apparatus. This second application of weight to the anchoring spears 7 and 8 should always be less than the initial weight applied during the embedding of the spears in the sides of the borehole so as to lessen the possibility of the anchorage failing while the nose piece 24 is in contact with the side of the borehole.

It should be noted that while the mandrel 61 is being lowered, any fluid trapped below the rubber seal 98, as from a previous test, is forced through the fluid sampling channels 73, 91 (Fig. 10) and 76 and out through the nose piece 24. The jetting action of this fluid tends to clean any excessive mud cake from the point of contact of the nose piece 24 with the borehole. After the apparatus has been positioned, as above described, circulation of drilling mud may be continued so as to plaster an impervious mud sheath on the borehole adjacent the edges of the sealing rubber 26 on the head 77 of the testing element, now firmly in contact with the borehole.

After or during this period of circulation, a bailer 47 (Fig. 6), is lowered through the pipe string 23 on a wire line or it may be dropped or circulated downward into position. The bailer is then operated and the sample of formation fluid is obtained from the fluid sample chamber 94 in the same manner as described above in connection with the first embodiment of this invention. It is apparent from Fig. 8 that by reversing the circulating fluid through the fluid port 83, passageway 74, and ports 69 and 100, the bailer may be pumped up the pipe string. If for any reason the fluid sample is contaminated, mud circulation may be continued, thereby effecting a seal of the nose piece 24 (Fig. 9) and the bailer can be rerun. As many samples as desired may be obtained by rerunning the bailer without removing the formation tester.

When the apparatus is moved in order to sample another part of the formation, the pipe string 23 is raised which causes the nose piece 24 (Fig. 10) to be drawn inward by the dovetail key 78 in the tapered surface of said head and the cooperating keyway 80 in the tapered surface of the bowl 62. Further raising of the pipe string causes the step threads 70 of the mandrel 61 to re-engage the threads in the spring positioned slips

11, which resets the apparatus. The pipe is then raised to a point at which the next fluid sample is to be obtained, and at that point the pipe string 23 is lowered causing spears 7 and 8 to reengage the sides of the borehole. The sequence of operations is then repeated. In this manner, as many samples as are desired may be obtained at any or various locations in the borehole.

I claim as my invention:

1. Well testing apparatus comprising a housing adapted to be lowered into a borehole at the end of a pipe string, a fluid sample chamber in said housing, testing means carried by said housing for lateral substantially horizontal outward motion with regard to the housing, fluid inlet means in said testing means in communication with the outside of the housing, outwardly extending cutting means on said testing means surrounding the fluid inlet means, resilient packer means on the outer end of said testing means surrounding said cutting means substantially flush therewith, passage means in communication between said fluid inlet means and said fluid sample chamber, and actuating means in the housing responsive to a downward motion of said pipe string for moving said testing means outwardly into contact with the wall of a borehole whereby said cutting means are caused to fracture said wall around said fluid inlet means, and said packer means are caused to seal off the fractured portion of said wall.

2. An apparatus for testing well formations adapted to be attached to a pipe string and lowered into a well, said apparatus comprising a housing, a fluid sample chamber in said housing, slidable testing means mounted transversely within said housing and adapted to be projected radially therefrom, fluid conduit means in said testing means in communication with the space outside of said housing at one end and with said fluid sample chamber at the other end, outwardly extending cutting means on said testing means surrounding the fluid conduit means on the outside of said testing means adapted to fracture the well wall, packer means surrounding said cutting means, axial fluid conduit means in said housing in communication with said pipe string, closure means normally closing said fluid conduit means in the housing, anchoring means carried by said body member for anchoring it in said well, and actuating means connected operatively to said anchoring means, said actuating means being adapted to project said testing means from the housing to engage the walls of the borehole.

3. An apparatus for testing well formations adapted to be attached to a pipe string and lowered into a well, said apparatus comprising a tubular housing, a fluid sample chamber in said housing, slidable testing means mounted on said housing and adapted to be projected radially therefrom, fluid inlet means in said testing means in communication with the space outside of said housing at one end and with said fluid sample chamber at the other, outwardly extending cutting means on said testing means surrounding the fluid inlet means on the outside of said testing elements adapted to fracture the well wall, a resilient packer surrounding said cutting means, axial fluid outlet means in said housing in communication with said pipe string, self-sealing closure means normally closing said fluid outlet means, anchoring means carried by said housing for anchoring it in said well, and lever means connected operatively to said housing, said lever means being adapted to project said testing elements from the housing to engage a formation to be tested and to withdraw said testing means into the housing.

4. An apparatus for testing well formations adapted to be attached to a pipe string and lowered into a well, said apparatus comprising a housing, a fluid sample chamber in said housing, slidable testing means carried by said housing and adapted to be projected radially therefrom, fluid conduit means in said testing means in communication with the space outside of said housing at one end and with said fluid sample chamber at the other end, axial fluid conduit means in said housing in communication with said pipe string, closure means normally closing said fluid conduit means in the housing, anchoring means carried by said housing for anchoring it in said well, and actuating means in sliding engagement with said testing means, said actuating means being responsive to upward and downward movement of the pipe string to project said testing means.

5. An apparatus for testing well formations adapted to be attached to a pipe string and lowered into a well, said apparatus comprising a housing, a fluid sample chamber in said housing, slidable testing means carried by said housing and adapted to be projected radially therefrom, fluid conduit means in said testing means in communication with the space outside of said housing at one end and with said fluid sample chamber at the other end, axial fluid conduit means in said housing in communication with said pipe string, closure means normally closing said fluid conduit means in the housing, anchoring means carried by said housing for anchoring it in said well, and actuating means secured to said anchoring means and in sliding engagement with said testing means along a line inclined with regard to the axis of the housing, said actuating means being adapted to project said testing means from the housing to engage the walls of the borehole in response to a downward motion of said pipe string after said anchoring means has been set in the well.

6. Well testing apparatus comprising the combination of a housing adapted to be lowered into a borehole at the end of a pipe string, anchoring means carried by said housing for engagement with the walls of the borehole, a fluid sample chamber in said housing, testing means carried by said housing for radial outward motion with regard to the housing, passage means in said testing means in communication with the outside of the housing at one end and with the fluid sample chamber at the other end, an axial passage in the housing adjacent the upper end thereof in communication between the fluid sample chamber and the inside of the pipe supporting the housing, packing means in said axial passage, bushing means affixed to the housing compressing said packing and normally closing the fluid sample chamber, a bailer adapted to be lowered within the pipe string to a position adjacent the housing, a tubular needle stem affixed to the bottom of the bailer, said needle stem being adapted to pass into the fluid sample chamber through said bushing and said packing means, and valved means controlling fluid flow through said tubular needle stem between the fluid sample chamber and the bailer, said valve means being adapted to open when the bailer is seated on said bushing.

7. Well testing apparatus comprising the combination of a housing adapted to be lowered into a borehole supported at the end of a pipe string, a fluid sample chamber in said housing, a testing member mounted in said housing for radial outward motion with regard to the housing, passage means in said testing member in communication with the outside of the housing at one end and with the fluid sample chamber at the other end, a telescoping member carried by the housing in axial sliding engagement therewith, anchoring means affixed to the telescoping member for engagement with the walls of the borehole, actuating means comprising a slanting guide bar affixed to the telescoping member and a slanting passage through the testing member in registering sliding contact with said bar, whereby an axial motion of the telescoping member with regard to the housing is translated into a radial motion of the testing member, an axial passage in the housing adjacent the upper end thereof in communication between the fluid sample chamber and the inside of the pipe supporting the housing, packing means in said axial passage, bushing means in screw threaded engagement with the housing compressing said packing and normally closing the fluid sample chamber, a bailer adapted to be lowered within the pipe string to a position adjacent the housing, a tubular needle stem affixed to the bottom of the bailer, said needle stem being adapted to pass into the fluid sample chamber through said bushing and said packing means, and valved means controlling fluid flow through said tubular needle stem between the fluid sample chamber and the bailer, said valve means being adapted to open when the bailer is seated on said bushing.

CHARLES S. PENFIELD.

REFERENCES CITED

The following references are of record in the file of this patent:

UNITED STATES PATENTS

| Number | Name | Date |
|---|---|---|
| 2,286,673 | Douglas | June 16, 1942 |
| 2,344,598 | Church | Mar. 21, 1944 |